Patented July 20, 1943

2,324,588

UNITED STATES PATENT OFFICE 2,324,588

ROTATIVE WINGED AIRCRAFT

Agnew E. Larsen, Jenkintown, Pa., assignor to Autogiro Company of America, Willow Grove, Pa., a corporation of Delaware Application October 31, 1940, Serial No. 363,593

31 Claims. (Cl. 244—18)

This invention relates to rotative winged aircraft, and is particularly concerned with a control system for that type of rotative winged aircraft which is capable of effecting what has become known in the art as "direct" take-off, i. e., take-off generally vertically from the ground or at a steep angle. The invention, moreover, is especially adaptable to that type of rotary wing aircraft in which a forward propulsion airscrew is employed for translational flight and in which, during such translational flight, the rotor is adapted to be autorotationally or aerodynamically rotated.

In aircraft of the class above referred to, direct take-off is ordinarily effected by mechanically driving the rotor with the craft at rest on the ground and with the blades of the rotor reduced to a non-lifting pitch angle, preferably zero pitch, in order to minimize rotational drag. Upon the attainment of a relatively high R. P. M., preferably considerably in excess of the normal R. P. M. of autorotational flight, the rotor drive is disconnected and the rotor blade pitch angle is increased, in consequence of which the excess kinetic energy stored in the rotor is converted to lift and the machine is caused to rise vertically from the ground or at least at a very steep angle.

While a take-off similar to the above may be effected in an aircraft in which the rotor drive is not normally disconnected in flight, in that event some means (such as two rotors driven in opposite directions) is necessary in order to counteract the rotor driving torque. Certain features of the present invention are applicable to aircraft of this latter type, although it is also to be noted that other features are particularly suited to the type in which the rotor drive is disconnected at or just before take-off.

Certain aspects of the invention are still further concerned with aircraft of the types mentioned above having a rotor brake and also wheel brakes.

Generally stated, the principal object of the present invention is the provision of an effective and fool-proof control system for various of the devices of the craft mentioned hereinbefore, the said system being capable of operation by the pilot in a very simple manner, thereby ensuring proper conditions for effecting the maneuvers intended by the pilot.

More specifically, the invention has in view a simplified control system automatically interrelating the operation of various devices of the craft, thereby simplifying the manipulations of flight and take-off and also increasing the safety factor by making it impossible for the pilot to incorrectly adjust certain of the controllable devices.

In considering the foregoing objects of the invention, it should be kept in mind that the points mentioned are of especial importance because of the fact that the direct take-off maneuver consumes only a matter of a few seconds time, during which the pilot obviously would not have opportunity to correct for maladjustment of one or more individually operable controls.

With the foregoing more or less general objects in view, the invention provides a single control for conjoint operation of the mechanism for adjusting blade pitch angle and of the device for connecting and disconnecting the rotor drive, the operation of these two units being correlated in that sense providing for blade pitch reduction when the rotor drive is connected and for blade pitch increase when the rotor drive is disconnected. In accordance with another aspect, the invention contemplates interlocking the operation of the common control above referred to with the control for the rotor brake and also preferably with the control for the wheel brakes, the sense of this interlock being such that the rotor drive clutch cannot be engaged at a time when the rotor brake is applied, and further such that the rotor drive clutch cannot be engaged unless the wheel brakes are applied.

Another object of the invention is the provision of a safety device automatically operative upon the aircraft leaving the ground to render the control system ineffective to engage the rotor driving clutch in flight or to reduce the rotor blade pitch angle. A portion of this same safety mechanism is also employed in accordance with the invention as a means to effect reduction of rotor blade pitch angle automatically upon landing of the aircraft, thereby avoiding unintentional re-take-off or the like under the influence of a wind gust.

The control system of this invention still further incorporates servo devices for utilizing fluid pressure developed by a pump driven by the engine in order to apply the rotor brake or the wheel brakes, or both, the rotor and wheel brakes also being equipped with additional means providing for manual application of these brakes in the event of engine failure.

With a view to still further simplifying the necessary manipulations in effecting take-off, the invention contemplates use of a control for the rotor blade pitch angle and the rotor driving clutch associated with the throttle for the engine and arranged so that the pilot may trip the control (thereby increasing blade pitch and disconnecting the rotor drive clutch) with the same hand with which he operates the engine throttle. This is of importance since, in the direct take-off maneuver, it is ordinarily desirable for the pilot to adjust the engine throttle to increase the engine speed at or just before the moment of take-off. With a control located on the engine throttle there need be no loss of time (and, therefore, of the kinetic energy stored in the rotor) between disconnecting the rotor drive and adjusting the throttle to increase the engine speed.

Since it is desirable, at least under certain conditions, to effect take-off after a short run on the ground, the invention provides a control system in which the operations of disconnecting the rotor drive clutch and increasing the blade pitch angle are effected sequentially. The invention also has in view manual operation of the control system in a manner introducing a time interval between rotor clutch disconnection and blade pitch increase. Still further, the invention contemplates the provision of automatic time delay mechanism for this purpose.

How the foregoing and other objects and advantages are secured will be more apparent from the following description referring to the accompanying drawings, in which—

Figures 1, 9:
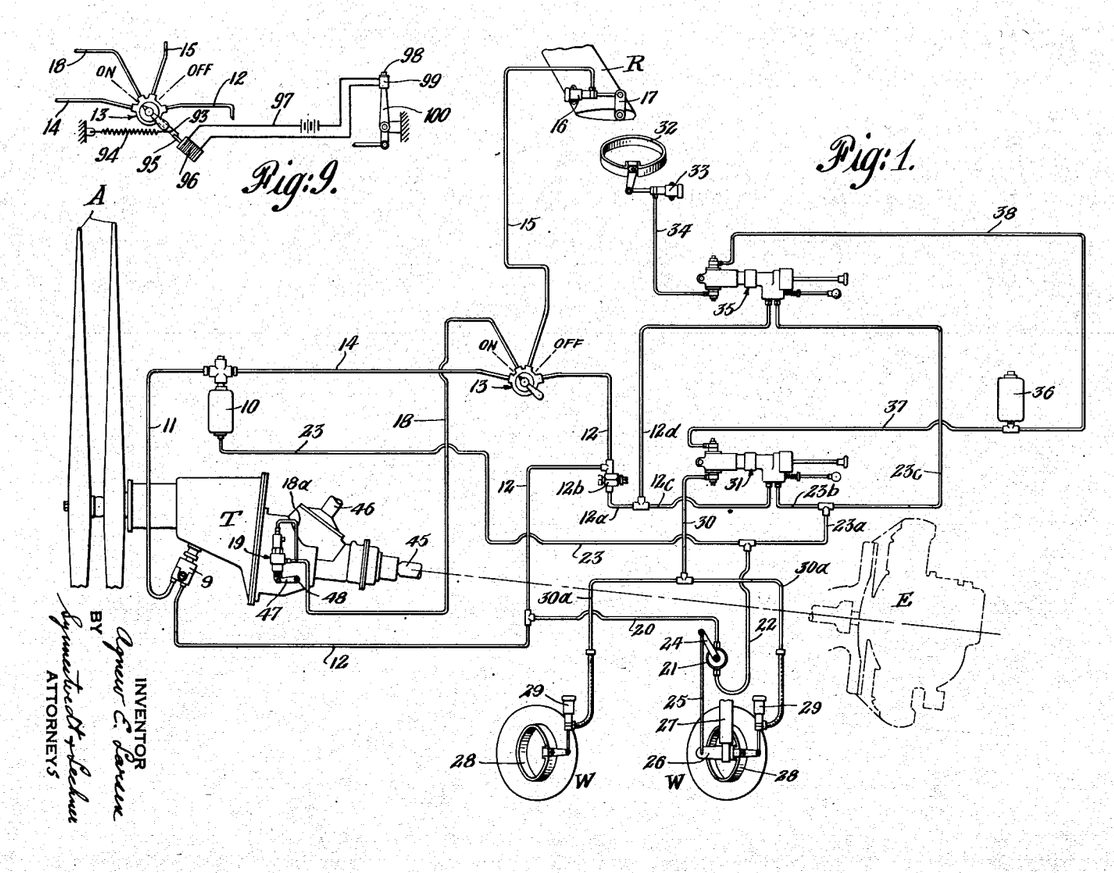
Figure 1 is a schematic diagram of the control system of the present invention including a showing of the principal devices and units of the aircraft with which the system is associated.
Figure 9 is a fragmentary view similar to Figure 1 but illustrating a modification.

In the diagram of Figure 1 the various principal devices and elements of the aircraft are indicated in their approximate relative positions. Thus a blade of the sustaining rotor appears at R toward the top of the figure, a pair of landing wheels W—W appearing toward the bottom. Toward the front of the machine (to the left as viewed in Figure 1) there is a pair of tandem coaxial airscrews A—A. The airscrews and rotor are all adapted to be driven from the engine E through a transmission T.

Various features of the major units referred to just above need not be considered in detail herein since they form no part of the present invention per se. It is to be understood, however, that the blades of the rotor are connected with the rotor hub by means of mounting pivots and devices providing freedom for pitch change movement of the blades, and preferably also for "flapping" and "drag" movements of the blades. Mechanism suitable for the purpose just mentioned is disclosed in my copending application Serial No. 271,841, filed May 5, 1939, now Patent No. 2,264,942, issued December 2, 1941, and also in Patent No. 2,216,163, issued October 1, 1940.

A brief description of a suitable blade mounting (as disclosed, for example, in the aforesaid copending application and issued patent) is here given to aid in an understanding of the operations effected by the control system of the present invention. Each blade is connected with the hub by means of a pair of external and internal cooperating threaded parts the axis of which is coincident with the longitudinal axis of the blade. The sense of the threading and the thread angle are such that the action of centrifugal force on the blade tending to draw the blade radially outwardly causes the blade to turn on the threaded mounting in a direction to increase its pitch angle. Movement of the blade on this mounting to reduce the pitch angle is effected by the control system hereinafter described.

In connection with the transmission T, it is to be observed that an appropriate form of transmission is fully disclosed in copending application of Robert G. Anderson, Serial No. 235,448, filed October 17, 1938, now Patent No. 2,217,883, issued October 15, 1940. Many features of this transmission need not be considered in detail herein since they form no part of the present invention per se, but it should be kept in mind that the transmission receives power from the engine E and serves to drive the airscrews A in opposite directions. For starting the rotor, the transmission incorporates a disconnectible clutch by means of which the rotor drive shaft may be coupled with the engine so as to deliver power to the rotor. A few other features of the transmission will be referred to more fully hereinafter.

With the foregoing general arrangement of parts in mind, attention is now directed to the control system as illustrated in the diagram of Figure 1. The system in general is of the hydraulic type, the pressure being developed by a pump 9 connected with some part of the transmission which always rotates with the engine E. A reserve tank 10 serves to keep the system supplied with pressure fluid, ordinarily oil, the inlet connection to the pump being indicated at 11. The outlet connection 12 from the pump extends to one port of the master control valve 13. A return line 14 connects another port of the valve 13 with the inlet line 11 for the pump.

Valve 13 has two additional ports one communicating with a connection 15 which is extended to a fluid pressure piston and cylinder device 16 connected with an arm 17 through which the device 16 is effective to alter the blade pitch from a higher to a lower pitch setting. The last of the ports of valve 13 is coupled by means of connection 18 and branch 18a with two portions of a piston and cylinder device generally indicated at 19, for control of certain transmission parts as will be described hereinafter with particular reference to Figure 7.

A by-pass is provided between the outlet (pressure) side of the pump 9 and the inlet side thereof. This by-pass includes a pipe 20 coupled with the pressure line 12, valve 21 and connections 22 and 23, the latter delivering to the reserve tank 10. The valve 21 in this by-pass connection is provided with an actuating arm 24 adapted to be operated by a link 25 which is extended for connection with a bracket 26 vertically movable with one of the landing wheels as the shock strut 27 is compressed upon landing and elongates upon take-off. The sense of this connection provides shut-off of the by-pass when the aircraft is at rest on the ground and opening of the by-pass when the craft is in the air, the reasons and operations involved being described more fully hereinafter.

Each of the landing wheels illustrated is provided with a wheel brake 28 adapted to be actuated by a piston and cylinder device 29 supplied with pressure through branches 30a of connection 30, the latter being associated with the wheel brake control unit indicated generally at 31.

Similarly, the sustaining rotor is provided with a rotor brake 32 actuable by a device 33 receiving fluid pressure through connection 34 which is associated with the rotor brake control unit generally indicated at 35. Fluid is supplied to the rotor and wheel brake actuating systems from a source of fluid independent of that first mentioned. Thus, as shown in Figure 1, the rotor and wheel brake source of fluid includes a reserve tank 36 and connections 37 and 38 extended respectively to the wheel brake unit 31 and the rotor brake unit 35.

Figures 4, 5, 6:
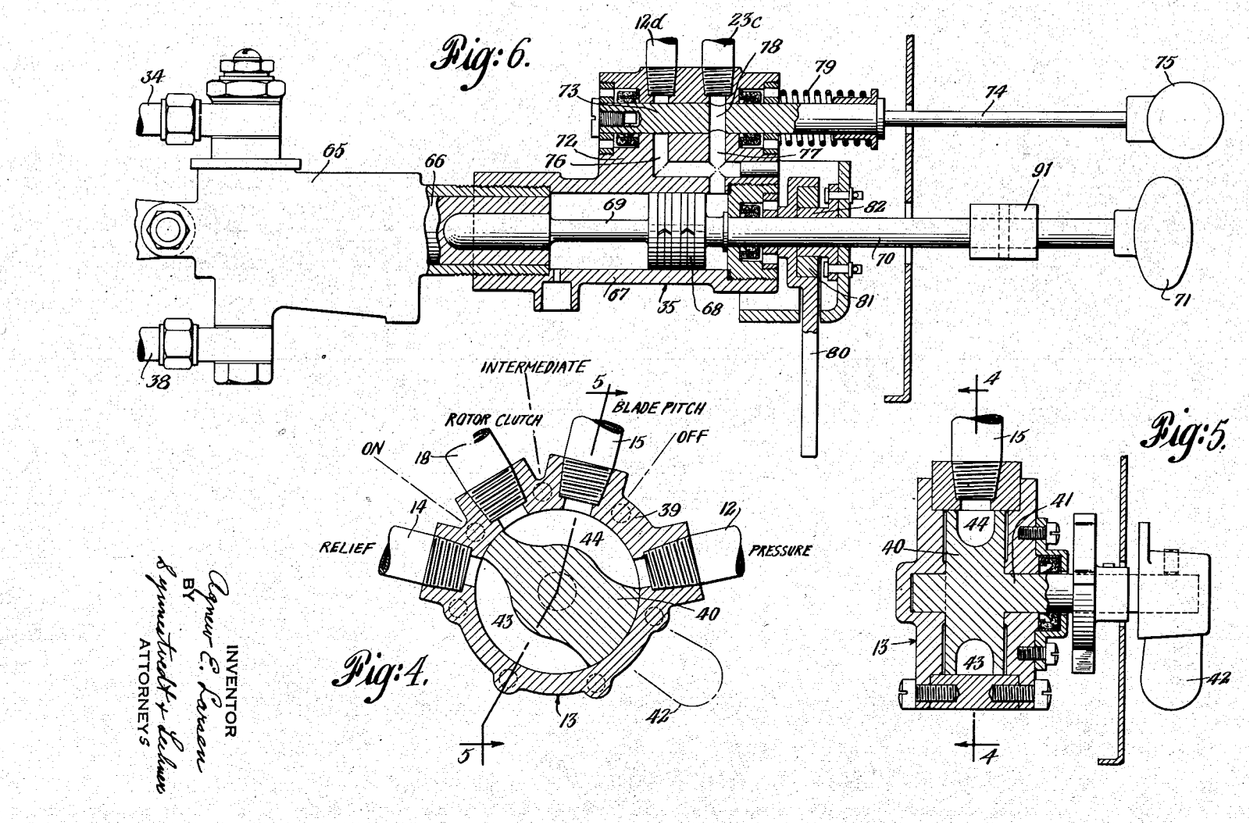
Figure 4 is a vertical sectional view through the main or master control valve associated with that portion of the control system connected with the rotor blade pitch changing devices and with the rotor drive clutch, this view being taken as indicated by the section line 4—4 on Figure 5.
Figure 5 is a cross sectional view of the master control valve taken as indicated by the line 5—5 on Figure 4.
Figure 6 is a view, partly in elevation and partly in vertical section, of one of the control units, including the servo control, employed for operation of the rotor brake and the wheel brakes.

Each of units 31 and 35 incorporates a servo control adapted to be actuated by fluid under pressure supplied from the pump 9. To this end a pipe 12a is connected with the pressure line 12 through a reducing valve 12b, pipe 12a being provided with a pair of branches 12c and 12d communicating respectively with the control units 31 and 35. The return side of this servo system includes a pipe 23a connected with by-pass line 23 and having a pair of branches 23b and 23c extended respectively to the units 31 and 35.

The rotor and wheel brake control units 31 and 35 are essentially similar in construction, one of them being described in detail hereinafter with reference to Figure 6.

Figure 2:
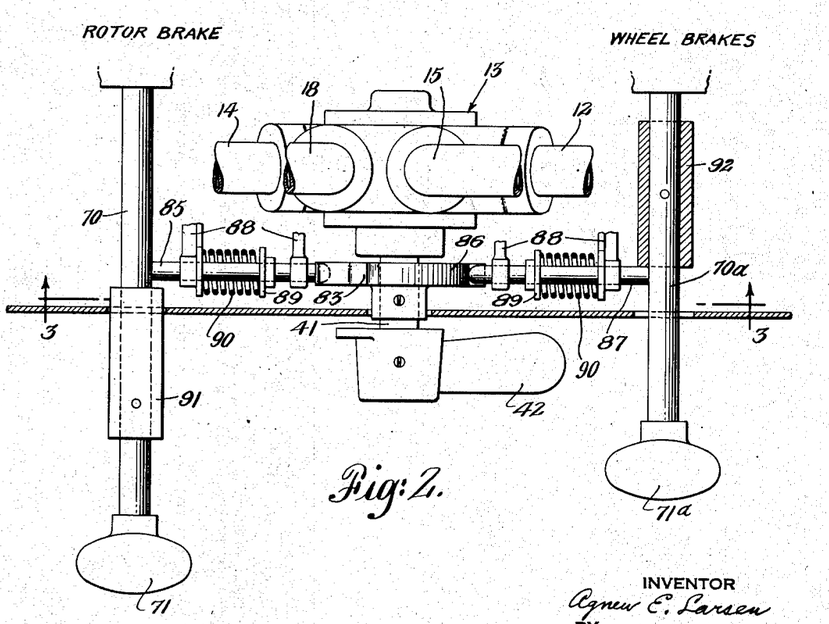
Figure 2 is a plan view of some of the control organs, certain parts being shown in horizontal section for clarity.

In taking up the description of various of the control units, attention is first directed to the showing, in Figures 2, 4 and 5, of the master control valve 13. This valve comprises a casing 39 having a chamber therein adapted to receive the rotative valve body 40 which latter is mounted on shaft 41 projecting from the casing and carrying an operating handle 42. The valve member proper (40) is circumferentially channeled toward opposite sides thereof, as indicated at 43 and 44, these channels being arranged to provide for the operation described just below.

In the position of the valve indicated in Figures 1 to 5 inclusive, the pressure line 12 from the pump 9 is connected with pipes 15 and 18 (through channel 44) which extend, respectively, to the pitch control devices 16 for the rotor blades and to the control device 19 of the transmission. This provides for decrease of rotor blade pitch and for connection of the rotor drive clutch, so as to enable starting of the rotor in preparation for direct take-off. As the valve member 40 is rotated in a clockwise direction, when viewed as in Figures 1 and 4, the initial movement connects pipe 18 with pipe 14 (through the valve channel 43) thereby dissipating the pressure previously applied to the transmission control device 19. Further movement of the valve member 40 in the clockwise direction connects pipe 15 with pipe 14 (through channel 43) with the result that the pressure in the rotor pitch controlling devices is dissipated.

Figures 7, 8:
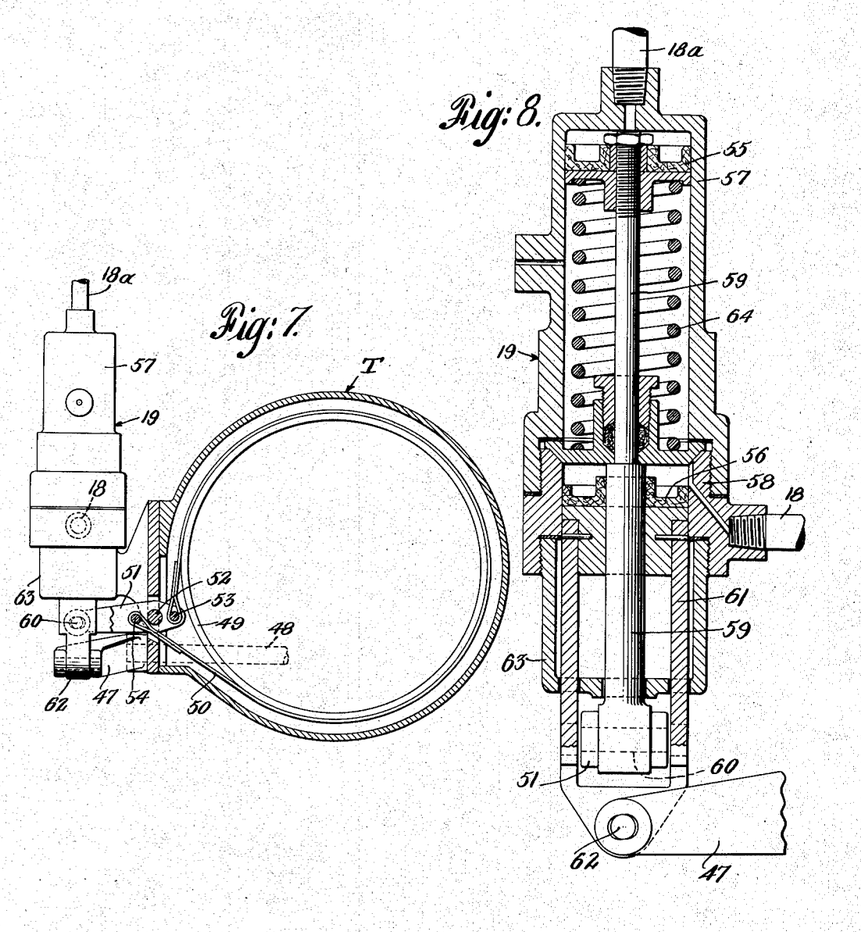
Figure 7 is a transverse sectional view through portions of the rotor and airscrew transmission, illustrating a fluid pressure control device associated with the transmission.
Figure 8 is a longitudinal sectional view through the control device illustrated in Figure 7.

At this point attention is directed to the disclosure of Figures 7 and 8 illustrating the control unit 19 and its connections with devices in the transmission T. As above mentioned (and as disclosed in the copending application 235,448 referred to), the transmission incorporates a disconnectible clutch in the rotor drive, this clutch being interposed between the engine driven shaft 45 and the rotor drive shaft indicated at 46 (see Figure 1) and being controllable by an arm 47 mounted on shaft 48. Still further, as disclosed in copending application 235,448, the transmission incorporates a planetary gear system interposed in the drive between the engine driven shaft 45 and the airscrews A—A. The planetary system, moreover, is adapted to provide two speeds of airscrew drive for a given engine speed. When the rotor is being driven the planetary system is not operative and the transmission gearing then provides relatively low airscrew R. P. M. for a given engine R. P. M.; and when the rotor clutch is disengaged the planetary system provides a higher gear ratio in the transmission to the airscrews.

The details of this gearing need not be considered herein, but it is important to note that in the change-over from the first condition to the second condition just mentioned one of the gear members of the transmission is subjected to a braking force to arrest its rotation, this member being indicated in Figure 7 at 49. Figure 7 also illustrates a brake band 50 surrounding member 49 and adapted to be operated by an arm 51 pivoted at 52, the two ends of the brake band being coupled with this arm by pins 53 and 54.

The showing of Figures 7 and 8 also includes the clutch controlling arm 47 and shaft 48.

The control unit 19 which appears in section in Figure 8 incorporates two independently movable piston devices 55 and 56, the first of which is arranged in cylinder 57 and the second in cylinder 58. Piston 55 is provided with a stem 59 projecting at the lower end of unit 19 and coupled with the arm 51 for operating brake 50 by means of a pin 60. Piston 56 is slidable on stem 59 of the first piston and is connected with a yoke 61 which projects from the lower end of unit 19. Yoke 61, in turn, is coupled with the clutch actuating arm 47 as by a pin 62. A cup 63 at the lower end of unit 19 is provided with apertures adapted to guide the stem 59 and the yoke 61. Fluid pressure is delivered to cylinder 57 through connection 18a and to cylinder 58 through connection 18 (see also Figure 1).

From the above it will be seen that this control unit 19 performs two functions in the transmission, i. e., connection and disconnection of the rotor driving clutch and application and release of the brake band 50, which latter serves as the means for changing the gear ratio in the transmission to the propulsive airscrews A—A.

It should now be noted that the control hookup is such that the rotor drive clutch is engaged and the brake band 50 is conjointly released upon admission of pressure to connection 18, as when the master valve 13 is positioned as in all the figures (in which position the rotor blade pitch is also reduced). Upon rotation of valve 13 in the clockwise direction, the pressure in connection 18 is dissipated and the rotor drive clutch is thereupon disconnected and the brake band 50 is tightened. Disconnection of the clutch is desirably effected by a release spring not herein illustrated, and tightening of the brake band 50 is accomplished by spring 64 which is located within unit 19 and arranged to move piston 55 upwardly. Because of the arrangement of these parts as just described, the conditions for normal flight (high airscrew speed, and rotor drive clutch disconnected) are maintained even in the event of failure of the fluid pressure system.

Turning now to the by-pass between the high and low pressure sides of the clutch and pitch control system, and with especial reference to the by-pass valve 21, it is to be observed that the master valve 13 is only effectve to deliver pressure to the pitch control devices 16 and to the transmission control device 19 when the by-pass valve 21 is closed. This valve is, therefore, coupled with a landing wheel in such manner as to close the valve when the aircraft is at rest on the ground. In consequence, automatically upon take-off the by-pass valve is opened and the high pressure line 12 is short circuited through pipes 20, 22 and 23, the last of which is coupled with the reserve tank 10.

The by-pass valve 21 serves a further important function, as follows: Since the master valve 13 is ineffective when the machine is in the air, when the pilot is approaching a landing he may adjust the valve 13 to a position intermediate its two extremes in which the high pressure line 12 is coupled by pipe 15 with the blade pitch control devices 16. While in the air this will not cause blade pitch reduction, but will automatically do so upon landing, at which time the by-pass valve 21 is closed, thereby establishing pressure in the system and effecting blade pitch reduction. This feature is of advantage in making landings, since the lift of the rotor is automatically "spilled" immediately upon landing.

Reference is now made to the structure of the control units for the rotor brake and the wheel brakes. Figure 6 illustrates the control unit 35 for the rotor brake. The portion of this unit toward the left of Figure 6 comprises a cylinder 65 having a piston 66 working therein, the connections 34 and 38 hereinbefore mentioned being associated with cylinder 65 in a well known manner in order to provide for delivery of pressure to the brake actuating cylinder 33 upon movement of piston 66 into the cylinder. The position of the parts shown in Figure 6 is that which they occupy when the brake is released. Adjoining cylinder 65 is another cylinder 67 having a piston 68 working therein, the piston stem 69 being extended for engagement with piston 66. A stem 70 projects from the opposite side of piston 68, being provided with an operating knob 71. By pushing on knob 71 piston 66 may be directly manually moved to apply the rotor brake. This manual control is desirably employed only in the event of failure of the servo pressure system now to be described.

A valve casing 72 is arranged at one side of cylinder 67, the casing serving to house a valve member 73 having a projecting stem 74 and an operating handle 75. Two ports 76 and 77 in the valve casing 72, communicate, respectively, with pressure and relief pipes 12d and 23c above mentioned. These two ports join at a point beyond the valve 73 and communicate with the right-hand end of cylinder 67 as is clearly shown in Figure 6.

The valve member 73 itself is provided with a port 78 which, in the position of the valve illustrated, is in registry with port 77 and, therefore, places the interior of cylinder 67 in communication with the relief pipe 23c. Upon manual inward displacement of the valve 73 port 78 is brought into registry with port 76 which places the pressure line 12d into communication with the cylinder 67, thereby effecting movement of piston 68 to the left. This, in turn, moves piston 66 to the left which applies the rotor brake. Valve 73 is biased to release position (the position shown in Figure 6) by a spring 79.

Any desired adjustment of the rotor brake may be retained by means of handle 80 journaled on the manually operable stem 70, the handle being connected with an eccentric bushing 81 adapted to clamp the stem 70 through the split collar 82.

The structure of control unit 31 for the wheel brakes is exactly the same as that described just above in connection with Figure 6.

From the foregoing it will be seen that each of the brake systems (the rotor brake or the wheel brakes) is readily operable by the servo control handle 75, and may also be operated in the event of engine failure by manual actuation of the control 71.

Referring again to the control system as shown in Figure 1, it should now be noted that the by-pass valve 21 not only serves to render the master valve 13 ineffective when the aircraft is in flight, but further serves to render the servo controls for the rotor and wheel brakes ineffective when the aircraft is in flight. This is a safety feature tending to avoid unintentional application of the rotor brake or of the wheel brakes, which latter should ordinarily remain released until after the wheels have touched the ground.

Figure 3:
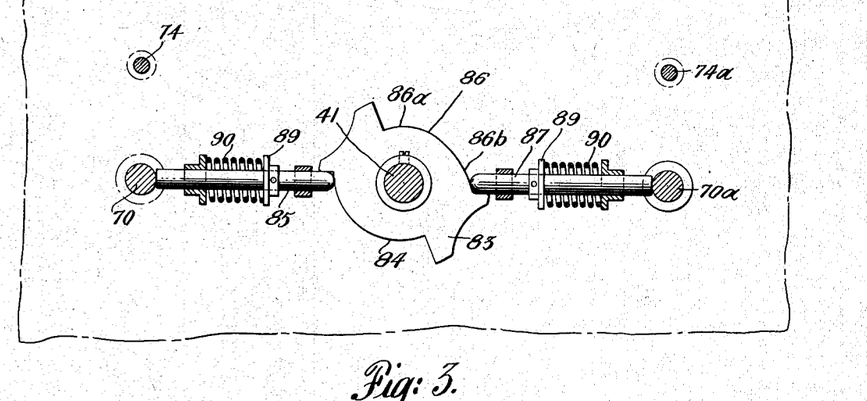
Figure 3 is a vertical section taken as indicated by the section line 3—3 on Figure 2.

The invention provides additional interlocks and safety features interrelating the operation of the rotor and wheel brake control units with operation of the master control valve 13. These interlocks are shown in Figures 2 and 3. As there seen, the manual control stem 70 for the rotor brake appears at the left and the manual control stem 70a for the wheel brakes at the right, one being located at each side of the valve 13 in parallelism with the operating stem 41 of the valve. This stem 41 carries a multiple cam 83, one surface 84 of which cooperates with a transversely slidable interlock pin 85 and the other surface 86 of which cooperates with a transversely slidable interlock pin 87. The two pins 85 and 87 are mounted in any convenient supports such as those indicated at 88, and each is provided with a collar 89 and an associated spring 90 urging the pin inwardly toward the cam surfaces 84 and 86.

The stem 70 of the rotor brake control is equipped with an interlock collar 91, and a similar collar 92 is mounted on the stem 70a for the wheel brake control. The position of these collars 91 and 92 lengthwise of the stems 70 and 70a and the length of the collars is such as to provide the following operation:

Referring to the position of the parts in Figures 1, 2 and 3—the control handle 42 for the master valve 13 is adjusted to admit pressure to the blade pitch control devices and to the control unit 19 for the transmission. With this adjustment, the rotor is adapted to be driven, and since it is undesirable at that time to permit actuation of the rotor brake, the collar 91 on the rotor brake control stem 70 is located so that if an attempt be made to apply the rotor brake the interlock collar will abut the plunger 85. At the other side of Figure 2 it will be noted that the wheel brake control stem 70a occupies its inner position, in which the collar 92 lies inside the plane of plunger 87. This is the position of wheel brake application, and at this time plunger 87 will retain the wheel brakes applied.

The interlocks just mentioned further prevent movement of the valve control handle 42 from the release position into the position shown in Figure 2 in either of two events. First, the control handle cannot be moved into the position shown in Figure 2 if the rotor brake is applied, since in that event the collar 91 lies in the plane of plunger 85 and, therefore, prevents outward movement of the plunger which, in turn (through the action of cam surface 84) prevents rotation of the control handle 42.

Second, the control handle cannot be moved to clutch-engaged position unless the wheel brakes are applied, for the reason that the axial dimension of the collar 92 is such that plunger 87 can only be moved outwardly by cam surface 86 when the stem 70a and its associated collar 92 are moved inwardly to clear plunger 87.

Because of the foregoing interlocks, the pilot is prevented from attempting to start the rotor at any time when the rotor brake is applied and, in addition, he cannot start the rotor unless the wheel brakes are applied.

At the moment of take-off, the movement of the control valve handle 42 releases plunger 87 which thereby automatically permits release of the wheel brakes.

Since it is desirable to permit the pilot to set the master control valve to its intermediate position in preparation for making a landing (in which position pipe 12 is connected with the blade pitch reducing devices 16), and since the wheel brakes should not be applied when making a landing, the cam surface 86 for actuation of the wheel brake interlock pin 87 is so shaped that the pin 87 is not moved outwardly to its interlocking position until after the master valve has passed the pitch-decrease position. Thus, as shown in Figure 5, the cam surface 86 is divided into two portions 86a and 86b, the former of which is low so as not to advance the plunger 87 throughout the range of valve movement between the "off" position and the position of pitch-decrease.

In accordance with the foregoing, a unified control system is provided in order to simplify the manipulations involved in various maneuvers and especially in effecting direct take-off. At the same time, interlocks afford safeguards and safety features which prevent undesired independent operations of various of the elements controlled by the system.

Another feature serving to simplify the control operations is illustrated in Figure 9. In this view (showing a portion of the control system of Figure 1) the master control valve 13 is equipped with an arm 93, the valve here being biased by a spring 94 to provide for automatic movement thereof from the rotor driving position to the flight position. A latch 95 is adapted to cooperate with arm 93 and is controllable by a solenoid 96 the operating circuit 97 of which may be completed by a thumb button 98 mounted at the top of the hand grip 99 of a throttle control lever 100 for the engine E.

In effecting direct take-off, it is ordinarily desirable to open the throttle to increase the engine speed at or just before the moment of take-off. With the arrangement of Figure 9, when preparing to effect the take-off, the pilot may place one hand on the throttle control (the other being used at the flight control wheel or stick) and when the rotor has been accelerated to the desired speed, the button 98 may be actuated to release the control valve 13, and without moving his hand from one control to another, the pilot may immediately advance the throttle to increase the engine speed.

In considering the operation of the control system already described, it is to be noted that the master control valve is arranged to provide sequential rotor clutch disconnection and blade pitch increase when a take-off is being made. While in the manually operable arrangement of Figure 1, the master control valve may be moved to effect take off at any desired rate, in the arrangement of Figure 9 the rate of movement would, of course, be predetermined by the characteristics of the return spring and of the valve itself.

In any event, the sequence referred to (clutch disconnection preceding blade pitch increase) is ordinarily desirable in effecting take-off since clutch disconnection is also accompanied by increase of airscrew speed which will, therefore, rapidly build up the airscrew thrust slightly in the lead of blade pitch increase. Where the master valve is entirely manually operable, as in Figure 1, this lead in disconnection of the clutch (and build-up of airscrew thrust) may be extended by the pilot, merely by initially moving the control valve to its intermediate position and then pausing for an appropriate interval before continuing the movement of the valve to increase the blade pitch. With the wheel brake interlock as described with reference to Figures 2 and 3, the initial movement of the master valve will also permit automatic release of the wheel brakes, in view of which a very steep and high take-off jump may be effected following a short run on the ground.

This timed or delayed take-off is desirable, at least under certain conditions, and with this in mind the invention further contemplates employment of the alternative modified forms of control system, such as that described hereinafter with reference to Figures 10 and 11.

Figure 10:
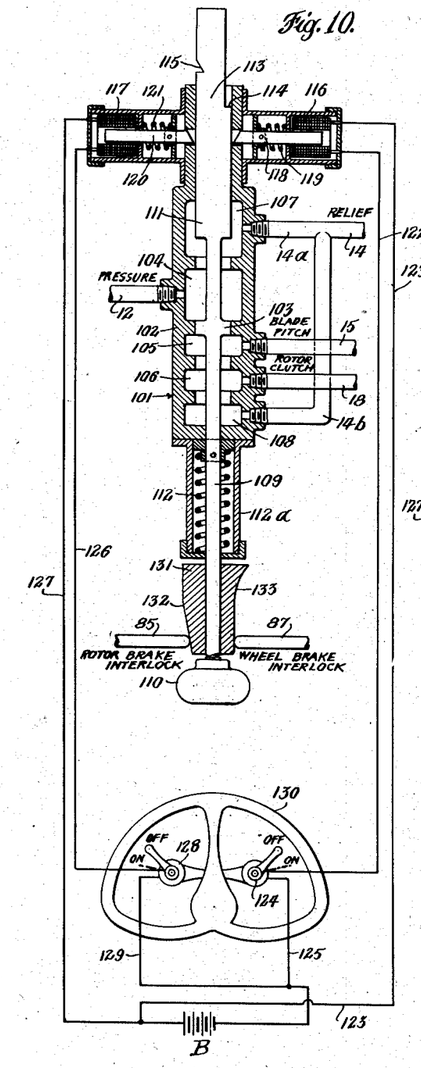
Figure 10 is a somewhat diagrammatic layout of another form of control system incorporating a modified master control valve.

Referring first to Figure 10, it is to be observed that the master control valve indicated generally at 101 is of the axially movable piston type comprising a valve casing 102 in which the valve member 103 is arranged for movement to establish and cut off communication between various chambers in the valve casing as described hereinbelow.

With reference to the valve chambers just mentioned, it may be noted that the piping system contemplated in accordance with the arrangement of Figure 10 is generally the same as that illustrated in Figure 1. The pressure line 12 communicates with chamber 104, the connections 15 and 18 for the rotor blade pitch and clutch controls respectively, communicating with chambers 105 and 106, respectively. The return or relief line 14 is branched as at 14a and 14b, these branches communicating, respectively, with chambers 107 and 108. Before describing the operation of this valve, it may be noted that the valve member 103 is manually controllable through its stem 109 having a control knob 110. When the valve is positioned as in Figure 10, the pressure line 12 is connected with the return line 14 through chambers 104 and 107. As the knob 110 is drawn outwardly to the position in which valve member 103 lies between chambers 105 and 106, an additional valve part 111 moves forwardly to block communication between chambers 104 and 107, thus shutting off the communication of the pressure line with the release line. In this second position, moreover, communication is established between chambers 104 and 105 with the result that pressure is delivered to the blade pitch control line 15, thereby effecting blade pitch reduction. As the valve is advanced still further, so that member 103 lies between chambers 106 and 108, pressure is admitted to chamber 106 and from there to the clutch control line 18. In this last position it should be noted that the valve member 103 blocks communication between chambers 106 and 108, thereby preventing release of pressure through the branch release line 14b.

From the above it will be seen that this master valve 101 provides for control in the same general manner as that described hereinbefore. In this arrangement, however, the master valve is preferably biased to release position, i. e., the position shown in Figure 10, by means of a return spring 112 disposed in a casing 112a at one end of the valve. At the opposite end, the valve member is provided with an extension 113, the end portion of which is cut away at one side to form a shoulder 114. At its other side the extension 113 is notched as at 115. Shoulder 114 and notch 115 are adapted to cooperate, respectively, with solenoid latch controls 116 and 117. The armature 118 of solenoid 116 has its end formed as a latch adapted to cooperate with shoulder 114, part 118 being urged toward its position of engagement by means of a spring 119. Similarly, the armature 120 of solenoid 117 is formed as a latch to cooperate with notch 115, this armature being urged toward its position of engagement by means of a spring 121.

The control circuit for solenoid 116 comprises connections 122 and 123, the latter of which is associated with a source of current B. Connection 122 is extended to a control switch 124, this circuit being completed through connection 125 extended to the source of current.

Similarly, solenoid 117 has a circuit including wires 126 and 127, the latter extending to the source of current B, and the former to a control switch 128. Connection 129 completes this circuit.

The control switches 124 and 128 are desirably mounted close to, and preferably on, the pilot's flight control, such as the steering wheel 130, thereby facilitating operation of the switches. It is to be understood that this wheel 130 serves for longitudinal and lateral control of the aircraft in flight, the same being coupled with rotor controls in the manner fully set out in my copending application Serial No. 209,511, filed May 23, 1938, now Patent No. 2,273,051, issued February 17, 1942.

In describing the operation of the system of Figure 10, it is first pointed out that shoulder 114 is positioned axially of the valve so that engagement with the armature 118 of solenoid 116 takes place when the valve member 103 is positioned between chambers 105 and 106. Additionally, it is to be noted that notch 115 is so positioned as to engage armature 120 of solenoid 117 when valve member 103 lies between chambers 106 and 108.

In operation, therefore, when it is desired to initiate rotation of the rotor on the ground prior to effecting direct take-off, the control knob 110 of the master valve 101 is drawn outwardly until notch 115 is engaged by armature 120. This provides for blade pitch reduction and actuates the control unit 19 (see Figure 1) of the transmission so as to provide low speed airscrew drive and so as to connect the rotor drive clutch. When the desired rotor R. P. M. has been attained, the switch 128 is actuated to release armature 120 from notch 115 and the return spring 112 of the master valve then causes the valve to move inwardly to the position in which the rotor drive clutch is disconnected and in which the airscrew speed is increased. At the appropriate moment, usually a couple of seconds after release of the rotor clutch, the other control switch 124 is then actuated in order to withdraw the armature 118 from shoulder 114, this operation permitting the return spring 112 to move the valve all the way to its release position, in which the blade pitch is increased and the take-off effected.

The system of Figure 10, therefore, places the timing of the take-off and the take-off run, if any, in the hands of the pilot.

If desired, the pilot may operate this system in a manner essentially similar to that provided by the system of Figure 9. This may be done either by simultaneously actuating both of the control switches 124 and 128 at the moment desired for take-off, or by preliminarily holding down (on) switch 124 and then, subsequently, actuating switch 128 at the moment desired for take-off.

In accordance with a further feature of Figure 10, the rotor brake and wheel brake interlocks are also associated with the master valve 101. For this purpose the interlock plungers 85 and 87 are associated with a cam 131, of which cam curface 132 corresponds to and functions in the same manner as cam surface 84 of Figure 3. At the other side, cam surface 133 corresponds to and functions in the same manner as cam surface 86 shown in Figure 3. It is here noted that cam surface 133, as in the arrangement first described, is shaped so as to delay actuation of the wheel brake interlock plunger 87 until the knob 110 of the master control valve is drawn outwardly beyond the position providing for blade pitch reduction.

Figure 11:
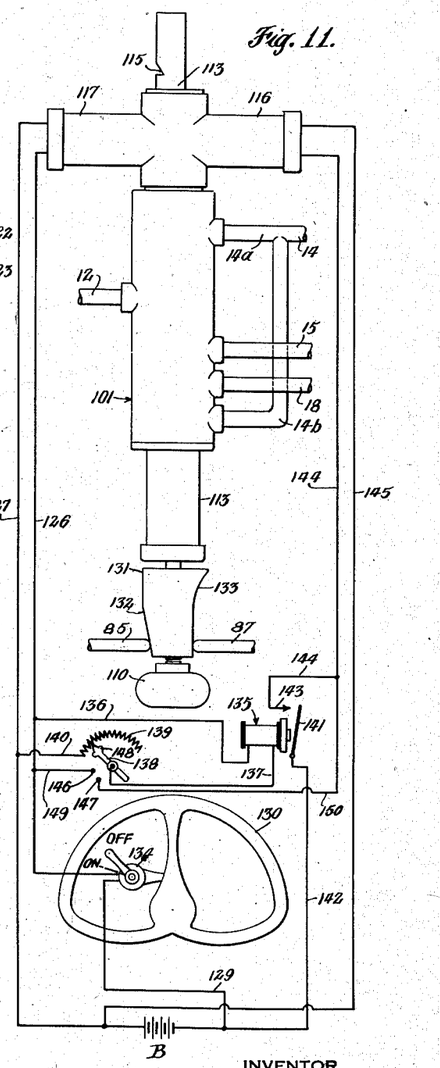
Figure 11 is a wiring diagram of a control system similar to Figure 10 but incorporating additional features hereinafter fully described.

The system of Figure 11 is similar to that of Figure 10, employing the same type of master control valve 101, and with solenoids 116 and 117 for actuating latches for control of valve movement from the "on" to the "off" position. In Figure 11, however, only a single control or trip switch is used. Although this switch is here shown as mounted in association with the control wheel 130, it is to be understood that it may take the form of and be mounted in accordance with the showing of Figure 9, wherein a control or trip switch is mounted on the throttle lever for the engine.

The control switch is here identified by the numeral 134, the switch being associated with a circuit including wires 126 and 127 extended to solenoid 117, as in Figure 10. The solenoid 116, however, is actuated through a time delay relay generally indicated at 135. One terminal of this relay is coupled by connection 136 with wire 126, the other terminal being coupled by connection 137 with the control member 138 of a combined switch and rheostat. The resistance 139 of this rheostat is connected with wire 127 by means of connection 140, the arrangement providing for adjustment of the resistance introduced in the circuit of relay 135. The pivoted armature 141 of this relay is coupled with the source of current B by a wire 142, and the contact 143 with which armature 141 is adapted to cooperate is coupled by a wire 144 with one terminal of solenoid 116. The other terminal of this solenoid is connected with the source of current B as indicated at 145.

The circuits just described provide for introduction of a predetermined time delay in actuation of solenoid 116, the extent of the delay being adjustable by varying the amount of resistance (139) included in the circuit of the relay 135. Thus, the pilot may predeterminedly set the control 138 for the rheostat to provide any desired time delay between disconnection of the rotor drive clutch and increase of rotor blade pitch, the entire system being tripped merely by a single control organ, i. e., the switch 134 which, as above indicated, is preferably mounted either in association with the control wheel or with the engine throttle.

The circuits of Figure 11 further include a cut-out for the time delay relay. For this purpose a pair of contacts 146 and 147 are positioned to cooperate with a switch part 148 mounted on the control 138 for the rheostat. Contact 146 is connected by a wire 149 with connection 126 and contact 147 is coupled by a wire 150 with connection 144.

This cut-out may be operated by moving the control handle 138 to a position beyond the range of rheostat 139, to close the circuit between contacts 146 and 147, thereby cutting out the time delay relay, so that actuation of the trip switch 134 simultaneously actuates both solenoids (116 and 117) in consequence of which take-off may be effected substantially without delay between rotor clutch disconnection and blade pitch increase. The system of Figure 11, therefore, is capable of operation in a variety of different ways in order to meet varying operating conditions, at the will of the pilot.

The use of a control for effecting take-off such as the trip switches of Figures 10 and 11) mounted in association with the flight control organ, is of particular advantage because of the fact that in effecting the take-off the rapid increase in rotor thrust may tend to cause the machine to nose downwardly or upwardly to an undesirable degree in the event that the loading or weight distribution at the time of any particular take-off is such as to provide a center of gravity location appreciably ahead of or behind the rotor lift line. With the take-off control mounted on the flight control organ, no movement of the pilot's hand is required between the take-off control and the flight control and the pilot may, therefore, adjust the flight control immediately upon and during the take-off to compensate for any nose-up or nose-down tendency.

With respect to the modified controls of Figures 9, 10 and 11, it is to be understood that in each instance applicant contemplates use of these controls in association with other features illustrated in Figure 1, including rotor brake and wheel brake controls, and the by-pass around the master valve, which is automatically opened when the aircraft leaves the ground and automatically closed when the aircraft alights.

I claim:

1. For an aircraft having a variable pitch sustaining rotor and mechanism for driving the rotor including a disconnectible device, mechanism for varying the rotor blade pitch angle between a substantially zero pitch setting and a positive autorotational pitch setting, means for actuating said device to connect and disconnect the rotor drive, and a control system for said pitch varying mechanism and for said actuating means including mechanism operated by take-off of the aircraft and connected with the pitch varying mechanism to render the pitch varying mechanism incapable of changing the blade pitch angle from said autorotational pitch setting to said substantially zero pitch setting when the aircraft takes off, and said mechanism operated by take-off further being connected with the means for actuating the device for connecting and disconnecting the rotor drive to render said actuating means incapable of connecting the rotor drive mechanism when the aircraft takes off.

2. A construction in accordance with claim 1, and further incorporating interlock means providing against connection of the rotor drive unless the blade pitch angle has been reduced to the substantially zero pitch position.

3. For an aircraft having a variable pitch sustaining rotor with a rotor brake associated therewith and mechanism for driving the rotor including a disconnectible device, mechanism for varying the rotor blade pitch angle between a substantially zero pitch setting and a positive autorotational pitch setting, means for actuating said device to connect and disconnect the rotor drive, mechanism interrelating the operation of the rotor brake and said disconnectible device and including means providing against application of the rotor brake when the rotor drive is connected, and a control system for said pitch varying mechanism and for said actuating means including mechanism operated by take-off of the aircraft and connected with the pitch varying mechanism to render the pitch varying mechanism incapable of changing the blade pitch angle to said substantially zero pitch setting when the aircraft takes off, and said mechanism operated by take-off further being connected with the means for actuating the device for connecting and disconnecting the rotor drive to render said actuating means incapable of connecting the rotor drive mechanism when the aircraft takes off.

4. For an aircraft having a sustaining rotor, rotor drive mechanism incorporating a disconnectible device, and a landing wheel having a brake associated therewith, a control system including mechanism interrelating the operation of the disconnectible device and the wheel brake and providing against connection of the rotor drive unless the wheel brake is applied.

5. For an aircraft having a variable pitch sustaining rotor, mechanism for varying the rotor blade pitch angle between a substantially zero pitch setting and a positive pitch setting, and a control system for said mechanism including means operated by take-off of the aircraft and connected with the pitch varying mechanism to render the pitch varying mechanism incapable of changing the blade pitch angle to said substantially zero pitch setting.

6. A construction in accordance with claim 5, wherein said mechanism for preventing undesired pitch reduction after take-off comprises a member movable to different positions under the influence of landing and take-off of the aircraft.

7. A construction in accordance with claim 5, wherein the mechanism for varying the rotor blade pitch angle comprises a fluid pressure system with valve means for rendering said system effective or ineffective to reduce the blade pitch angle, and wherein said mechanism for preventing undesired pitch reduction after take-off comprises an additional valve associated with said fluid pressure system, and means operated by take-off of the aircraft to adjust said additional valve to render said fluid pressure system incapable of effecting undesired blade pitch reduction.

8. For an aircraft having a variable pitch sustaining rotor, a fluid pressure control system for varying the blade pitch including a valve adjustable between positions in which the pressure fluid is effective and ineffective to reduce the blade pitch, an additional valve associated with said system for rendering the first valve effective or ineffective, and means operated by landing and take-off of the aircraft to adjust the additional valve to respectively provide conditions in which the first valve is effective and ineffective to reduce the rotor blade pitch angle.

9. A construction in accordance with claim 8, wherein the first valve is adjustable during flight of the craft into its position providing for blade pitch reduction, whereby upon landing of the aircraft the consequent actuation of the second valve automatically effects blade pitch reduction.

10. For an aircraft having a variable pitch sustaining rotor and a rotor drive mechanism incorporating a disconnectible device, a control system for varying the blade pitch and for actuating said disconnectible device to connect and disconnect the rotor drive, said system including a manually operable control adjustable between positions providing for blade pitch increase and blade pitch decrease and to connect and disconnect the rotor drive, a second manually operable control associated with the control system for rendering the first control effective or ineffective, and means operated by landing and take-off of the aircraft to adjust the second control to respectively provide conditions in which the first control is effective and ineffective to reduce the rotor blade pitch angle and connect the rotor drive.

11. A construction in accordance with claim 10, in which actuation of said first control in one sense sequentially effects reduction of blade pitch and then connection of the rotor drive, the said first control being adjustable during flight into its position providing for blade pitch reduction, whereby upon landing of the aircraft the consequent actuation of the second control automatically effects blade pitch reduction.

12. For an aircraft having a variable pitch sustaining rotor, a rotor drive mechanism incorporating a disconnectible device, and a landing wheel with a brake associated therewith, a control system for varying the blade pitch and for actuating said disconnectible device to connect and disconnect the rotor drive, said system including a manually operable control adjustable between positions providing for pitch increase and pitch decrease and to connect and disconnect the rotor drive, a second control associated with said system for rendering the first control effective or ineffective, means operated by landing and take-off of the aircraft to adjust the second control to respectively provide conditions in which the first control is effective and ineffective to reduce the rotor blade pitch angle and connect the rotor drive, and means interlocking the operation of said first control and of the wheel brake and providing against actuation of the first control to connect the rotor drive unless the wheel brake is applied.

13. A construction in accordance with claim 12, in which actuation of the first control in one sense sequentially effects reduction of blade pitch and then connection of the rotor drive, the said first control being adjustable during flight of the craft into its position providing for blade pitch reduction, whereby upon landing of the aircraft the consequent actuation of the second control automatically effects blade pitch reduction.

14. A construction in accordance with claim 12, and further including a manually operable control for the wheel brake, and means operated by actuation of the second control when the aircraft leaves the ground to render the brake control ineffective.

15. A construction in accordance with claim 12, in which actuation of the first control in one sense sequentially effects reduction of blade pitch and then connection of the rotor drive, the said first control being adjustable during flight of the craft into its position providing for blade pitch reduction, whereby upon landing of the aircraft the consequent actuation of the second control automatically effects blade pitch reduction, and further incorporating a manually operable control for the wheel brake, and means operated by actuation of the second control when the aircraft leaves the ground to render the brake control ineffective.

16. For an aircraft having a variable pitch sustaining rotor and a rotor drive mechanism incorporating a disconnectible device, a fluid pressure control system for varying the blade pitch and for actuating said disconnectible device to connect and disconnect the rotor drive, said system including a valve adjustable between positions in which the pressure fluid is effective and ineffective to reduce the blade pitch and to connect the rotor drive, an additional valve associated with said system for rendering the first valve effective or ineffective, and means operated by landing and take-off of the aircraft to adjust the second valve to respectively provide conditions in which the first valve is effective and ineffective to reduce the rotor blade pitch angle and connect the rotor drive.

17. A construction in accordance with claim 16, in which actuation of the first valve in one sense sequentially effects reduction of blade pitch and then connection of the rotor drive, the said first valve being adjustable during flight of the craft into its position providing for blade pitch reduction, whereby upon landing of the aircraft the consequent actuation of the second valve automatically effects blade pitch reduction.

18. For an aircraft having a variable pitch sustaining rotor, an engine with a speed control therefor, and mechanism for driving the rotor including a disconnectible device, and a control system for the rotor blade pitch angle and for the rotor drive disconnecting device including means providing for drive of the rotor at a low blade pitch angle, means providing for conjoint disconnection of the drive and increase of the blade pitch angle, and a manual control element for actuating said last means to disconnect the rotor drive and increase the blade pitch, said control element being closely associated with the engine speed control to provide for operation thereof and of the speed control by one hand of the pilot without necessitating movement of said hand from one control to the other.

19. A construction in accordance with claim 18, wherein the engine speed control takes the form of a displaceable member having a hand grip and in which said control for disconnecting the rotor drive and increasing the blade pitch is associated with said hand grip.

20. For an aircraft having a variable pitch sustaining rotor, an engine with a speed control therefor, and mechanism for driving the rotor including a disconnectible device, a control system for the rotor blade pitch angle and for the rotor drive disconnecting device including means providing for conjoint operation thereof, said system including a manually operable control for actuating said means closely associated with the engine speed control to provide for operation thereof and of the speed control by one hand of the pilot without necessitating movement of said hand from one control to the other.

21. For an aircraft having a variable pitch sustaining rotor, an engine with a speed control therefor, and mechanism for driving the rotor including a disconnectible device, a control system for the rotor blade pitch angle and for the rotor drive disconnecting device including a manually operable control, and mechanism providing for actuation of the control system to increase the blade pitch including means biasing said manually operable control to its position in which the blade pitch angle is increased, a latch for retaining said manually operable control in the position last mentioned, and means for tripping said latch closely associated with the engine speed control to provide for operation thereof and of the speed control by one hand of the pilot without necessitating movement of said hand from one control to the other.

22. A construction in accordance with claim 21, in which the means for tripping said latch comprises an electro magnetic device.

23. For an aircraft having a variable pitch sustaining rotor with a brake associated therewith, a hydraulic control system for the rotor blade pitch and for the rotor brake including a hydraulic device for actuating the rotor brake, a hydraulic device for changing the blade pitch, a piston and cylinder device for delivering pressure fluid to the brake applying device, a source of fluid pressure, valve means for delivering pressure fluid from said source to the pitch varying device, and a servo actuating means for said piston and cylinder device utilizing the pressure fluid of said source to effect application of the rotor brake.

24. A construction in accordance with claim 23, and further incorporating manually operable means for actuating said piston and cylinder device to apply the rotor brake, whereby said brake may be operated notwithstanding failure of said source of fluid under pressure.

25. For an aircraft having a variable pitch sustaining rotor and a landing wheel with a brake associated therewith, a hydraulic control system for the rotor blade pitch and for the wheel brake including a hydraulic device for actuating the wheel brake, a hydraulic device for changing the blade pitch, means for delivering pressure fluid to the brake applying device, a source of fluid pressure, a valve for delivering pressure fluid from said source to the pitch varying device, and a servo actuating mechanism for said means utilizing the pressure fluid of said source to effect application of the wheel brake.

26. A construction in accordance with claim 25, and further incorporating a manually actuated member for actuating said means to apply the wheel brake, whereby said brake may be operated notwithstanding failure of said source of fluid under pressure.

27. For an aircraft having a variable pitch sustaining rotor and a disconnectible rotor drive, a control system providing for sequential disconnection of the rotor drive and increase of blade pitch in that order, a time delay device providing an interval between disconnection of the rotor drive and increase of blade pitch, and adjustable means for predetermining the period of time delay of said device.

28. For an aircraft having a variable pitch sustaining rotor and a disconnectible rotor drive, a control system providing for sequential disconnection of the rotor drive and increase of blade pitch in that order, a time delay device providing an interval between disconnection of the rotor drive and increase of blade pitch, and means for rendering said time delay device ineffective.

29. A construction in accordance with claim 28, and further incorporating adjustable means for predetermining the period of time delay of said device.

30. For an aircraft having a variable pitch sustaining rotor and a disconnectible rotor drive, a control system including interlocking control connections positively assuring sequential disconnection of the rotor drive and increase of blade pitch in that order, said system further including manually operable control means for actuating the control system to disconnect the rotor drive, and manually operable control means for actuating the control system to increase the blade pitch, said two manually operable control means being sequentially operable in any timed relation determined by the pilot.

31. For an aircraft having a variable pitch sustaining rotor, a disconnectible rotor drive, and a flight control organ, a control system including means pre-establishing an operating inter-relation between mean rotor blade pitch variation and connection and disconnection of the rotor drive, and a manually operable control member for actuating said control system mounted in association with the flight control organ for actuation by one hand of the pilot without moving said hand from one control to the other.

AGNEW E. LARSEN.